Aug. 19, 1952 E. T. PLATZ 2,607,868

CIRCUIT BREAKER

Filed Feb. 17, 1949 8 Sheets-Sheet 1

Fig.1 OFF

INVENTOR.

Elwood T. Platz

BY Daniel J. Cullen

Attorney

INVENTOR.
BY Elwood T. Platz
Daniel G. Cullen
Attorney

Aug. 19, 1952 E. T. PLATZ 2,607,868

CIRCUIT BREAKER

Filed Feb. 17, 1949 8 Sheets-Sheet 3

Fig. 3 Tripped

INVENTOR.
Elwood T. Platz
BY Daniel [illegible]
Attorney

Aug. 19, 1952

E. T. PLATZ

CIRCUIT BREAKER 2,607,868

Filed Feb. 17, 1949

8 Sheets-Sheet 4

Fig. 4 OFF

INVENTOR.

Elwood T. Platz

BY Daniel G. Cullen

Attorney

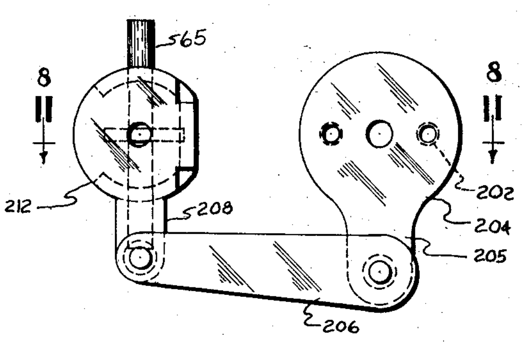
Fig. 5
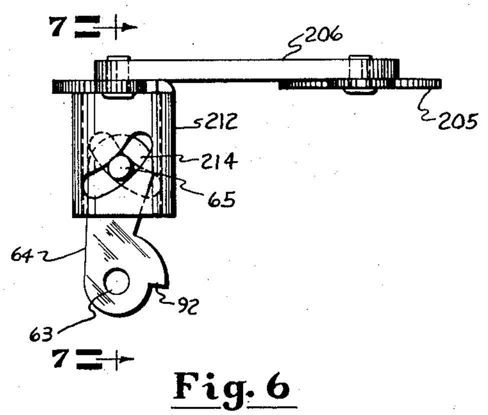
Fig. 6
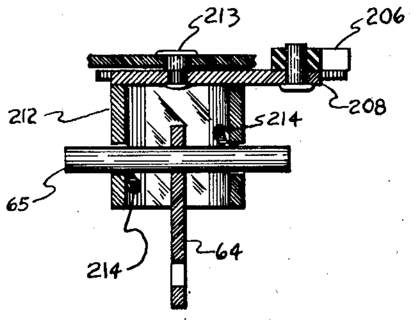
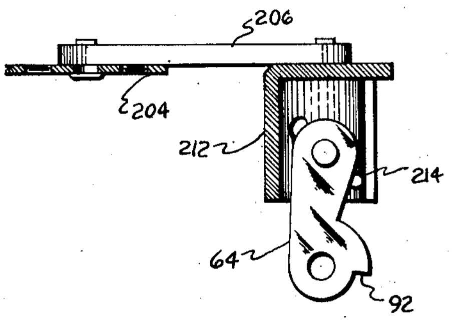
Fig. 7 Fig. 8
INVENTOR.
Elwood T. Platz
BY
Daniel G. Cullen
Attorney INVENTOR.
Elwood T. Platz
BY David G. Bullen
Attorney Aug. 19, 1952 E. T. PLATZ 2,607,868

CIRCUIT BREAKER

Filed Feb. 17, 1949 8 Sheets-Sheet 7

INVENTOR.
Elwood T. Platz
BY
Daniel G. Cullen
Attorney

Aug. 19, 1952 E. T. PLATZ 2,607,868

CIRCUIT BREAKER

Filed Feb. 17, 1949 8 Sheets-Sheet 8

INVENTOR.

BY Elwood T. Platz

Daniel G. Cullen

Attorney

Patented Aug. 19, 1952

2,607,868

UNITED STATES PATENT OFFICE 2,607,868

CIRCUIT BREAKER

Elwood T. Platz, Detroit, Mich., assignor to Bulldog Electric Products Company, Detroit, Mich., a corporation of West Virginia Application February 17, 1949, Serial No. 77,035

3 Claims. (Cl. 200—89)

This application relates to circuit breakers, and particularly to circuit breakers having a manually operable handle or actuator arrangement operatively connected by a toggle type control arrangement or linkage system to a contactor for manually opening and closing the circuit, with a latch whose automatic release automatically permits a spring to collapse the toggle, free of the handle or actuator arrangement and thus to open the circuit. The latch normally inhibits opening operation except when the latter is caused manually, as by movement of the handle or actuator arrangement.

It is a particular object of this invention to provide a novel form of manual operation arrangement for the control or toggle linkage system of such a circuit breaker.

The invention may be embodied in numerous forms. Two such forms are shown in the drawings of this application.

For an understanding of the two embodiments herein disclosed, reference should be had to the appended drawings.

In these drawings:

Figs. 5 and 6 are plan and elevation views of certain parts of the manual operation arrangement.

Fig. 7 is a section view on line 7—7 of Fig. 6.

Fig. 8 is a section view on line 8—8 of Fig. 5.

*The circuit*

Figure 1:
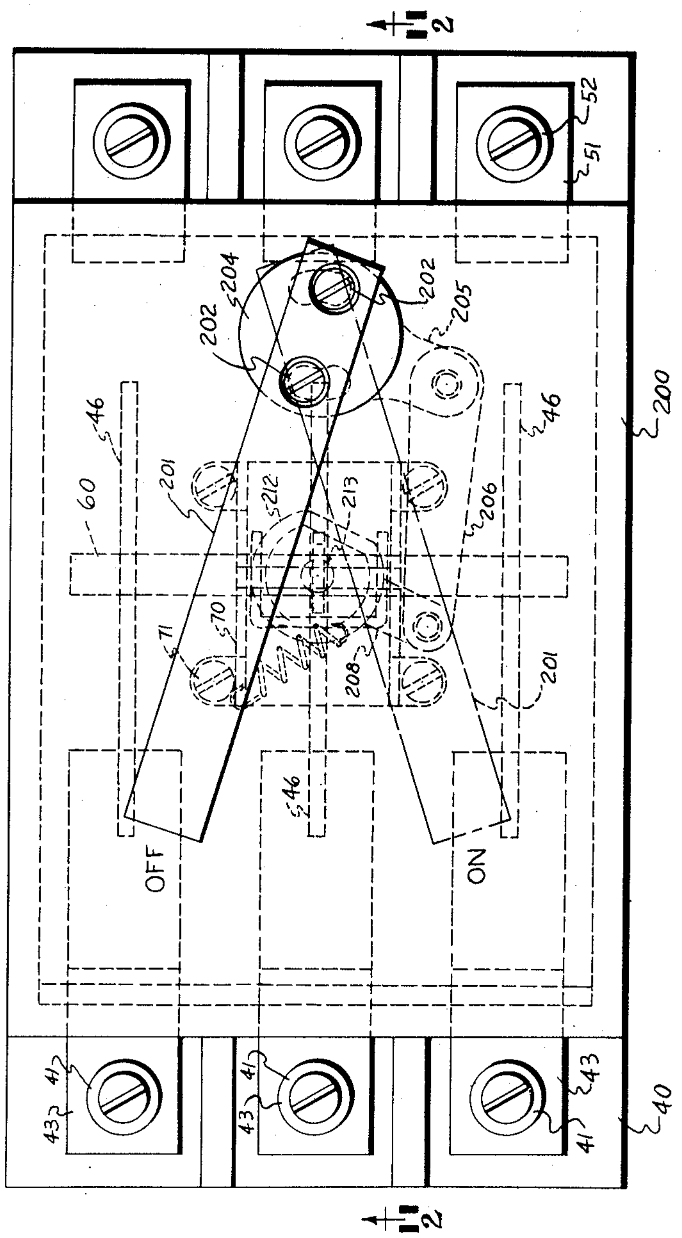
Fig. 1 is a plan view showing a multipolar magnetic latch trip embodiment of circuit breaker, with the parts shown in "off" or open circuit position.

Referring to the drawings, it will be observed that Figs. 1–13 show a multipolar circuit breaker which includes an insulation base 40 at one end of which are line connectors 41 which may be connected to line bus bars, not shown. Straps 43 connect the line connectors 41 to stationary contacts 44 adapted to be engaged by contact tips 45 of movable contactors 46 pivotally mounted on loose pivots 47 and connected by flexible connectors 48 to trip coils 49, in turn connected by straps 51 to load connectors 52 to which branch or load conductors may be in turn connected.

Thus, the circuit from a line bus bar to a load or branch circuit conductor is established through parts 41—43—44—45—46—48—49—51—52.

*The toggle linkage*

For controlling the movement of the contactors 46 of the breaker, a control arrangement or toggle linkage mechanism is provided and the same will now be described. Connecting the one or more circuit breaker contactors 46 of the breaker is an axle 60 of insulation, Fig. 13, which passes through holes in the lower end of a lower end of a lower toggle link 62 connected by a transverse pin 63 to the lower end of a second or upper toggle link 64 whose upper end is provided with a transverse pin or shaft 65 whose ends are disposed in clearance slots 68 on opposite sides or legs of a U-shaped frame 70 mounted on the base 40 as by screws 71.

The upper toggle link 64 has a holding extension or tip 92 adapted to be engaged by a latching member 96 of U-form having in its upper leg 97 a release notch 98 for releasing the latching or holding tip 92. The U-shaped latch 96 has its upper leg 97 positioned in a hole 101 of the lower toggle link 62 and its lower leg 103 positioned in a hole 105 of that link 62, the hole 105 being considerably larger in diameter than the lower leg 103, whereby the latter may move laterally to rock the upper leg 97 for latching or releasing purposes. Latch 96 thus will be seen to be mounted on the lower link 62 to releasably latch the toggle links 62—64 together.

Main operating springs 121 are provided for biasing the contactors 46 to open circuit position, either by collapsing or breaking the toggle 62—64 at knee or pin 63 if the toggle 62—64 is unlatched at 92—98, or by moving the toggle linkage 62—64 upwardly as a unit, if latched at 92—98.

Figure 2:
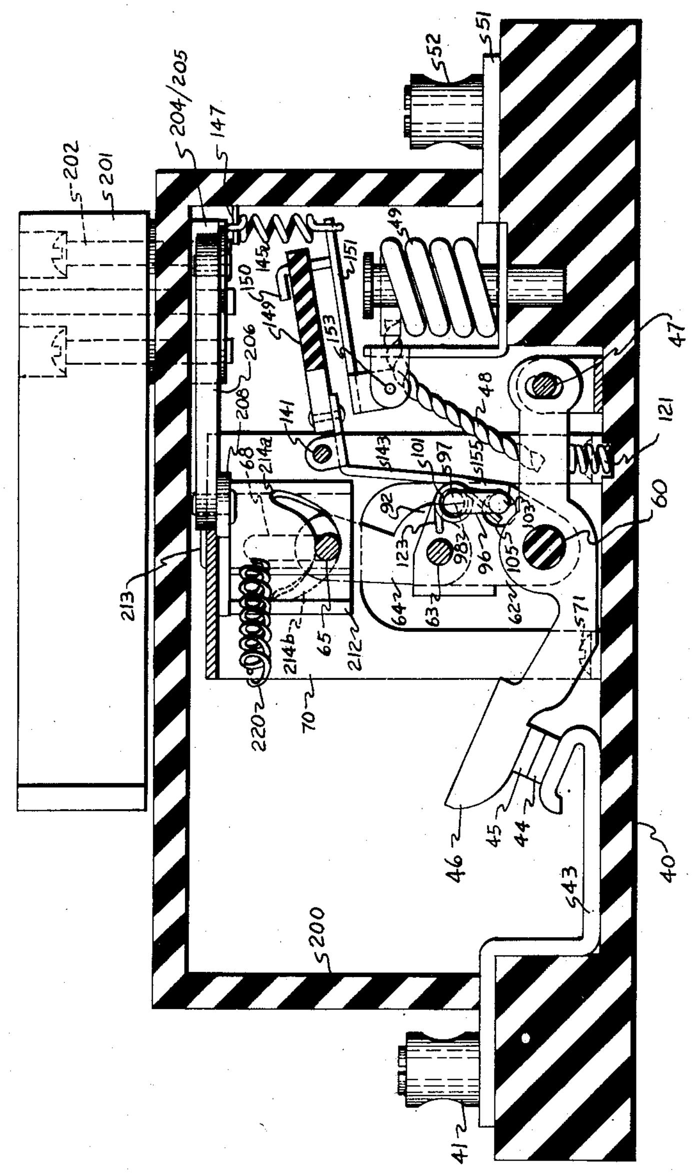
Fig. 2 is a section view, as if on line 2—2 of Fig. 1, but showing the circuit breaker parts in the "on" or circuit closed position.
Figure 13:
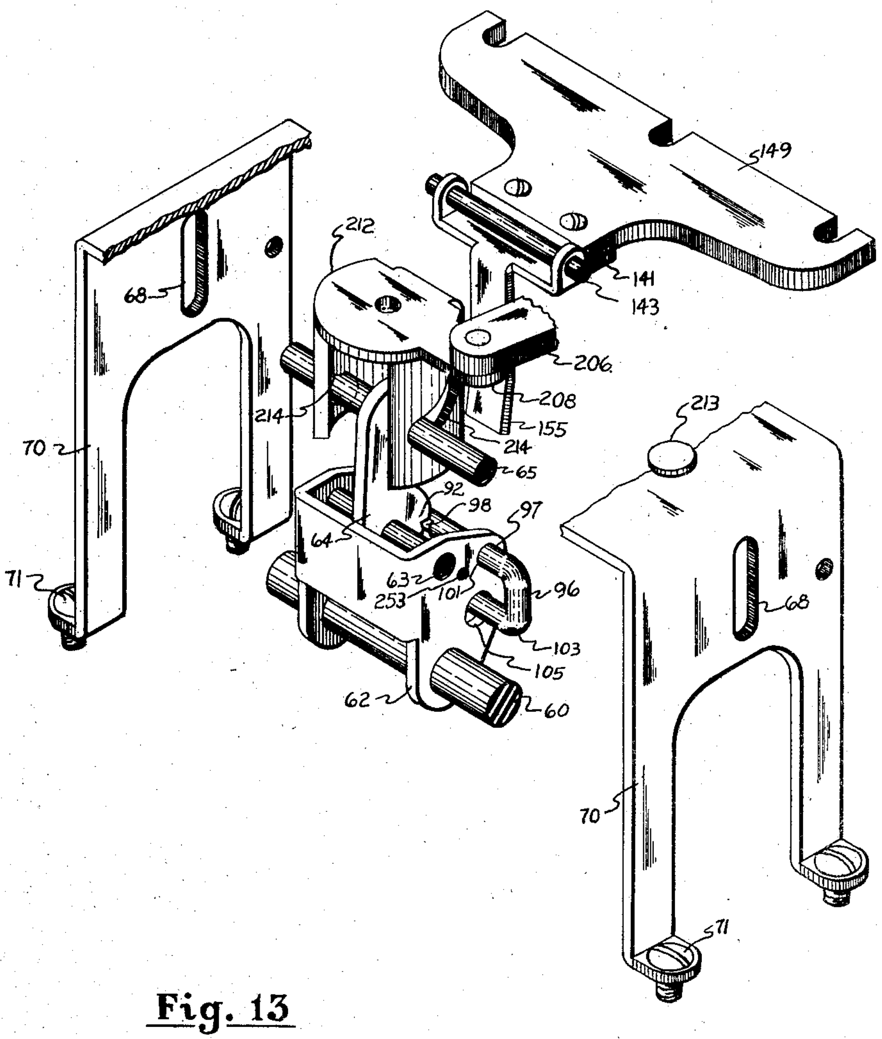
Fig. 13 is an exploded view of parts of the breaker mechanism.

A relatching spring 123 mounted on upper leg 97 of latch 96 has one extending end 125 positioned in hole 253 of the link 62 (Fig. 13). The other extending end 127 is arranged to bias the lower leg 103 of latch 96 constantly to the right as shown in Fig. 2, for relatching.

*The latch trip means*

Pivotally mounted at 141 on frame 70 is a latch trip lever 143 constantly biased counterclockwise by a spring not shown connecting it and the frame 70 (Fig. 4) and having on its free end an insulating plate 149 over whose edge is loosely hooked a hook portion 150 of an armature 151 pivoted in the breaker at 153 and adapted to be pulled down by an overload in any one of the several electro-magnetic trip coils 49 to rock the trip lever 143 clockwise so that a striker portion 155 of the trip lever 143 will engage the lower leg 103 of the U-shaped latch 96 to rock it clockwise on the axis of its upper leg 97 as a pivot, the upper leg being journalled in hole 101 of link 62, to align release notch 98 of the latch 96 with the holding extension 92 of link 64 for releasing the latter and the mechanism as a whole, on overload in any pole of the breaker.

*The manual actuation means*

Disposed above the insulating cover 200 of the breaker is an exposed handle 201 connected by downwardly projecting screws or pins 202 to a circular plate 204 forming the end of a link 205 connected through a second link 206 to a laterally projecting arm 208, Fig. 5, of a sleeve 212 journalled at its uper end by a pin 213 to the upper or bight surface of the U-shaped frame 70 and having spiral slots 214*a*—214*b* through which passes the pin or shaft 65. A sleeve return spring 220 connects the sleeve 212 to the frame 70 as indicated in Fig. 2.

*Operation*

When the parts are in the "on" or circuit closed position, as shown in Fig. 2, notch 98 of upper leg 97 of latch 96 is not in alignment with holding extension 92 of link 64, but rather that holding extension 92 is engaged by the leg 97, the latter being then held in its latching position by the bias of spring 123 counterclockwise on the lower leg 103 of latch 96. The bias of springs 121 on contactors 46 to bias them upwardly on their pivots 47 is restrained by the toggle formed by links 62—64, locked by the engagements at 65—214 and 92—98.

Figure 4:
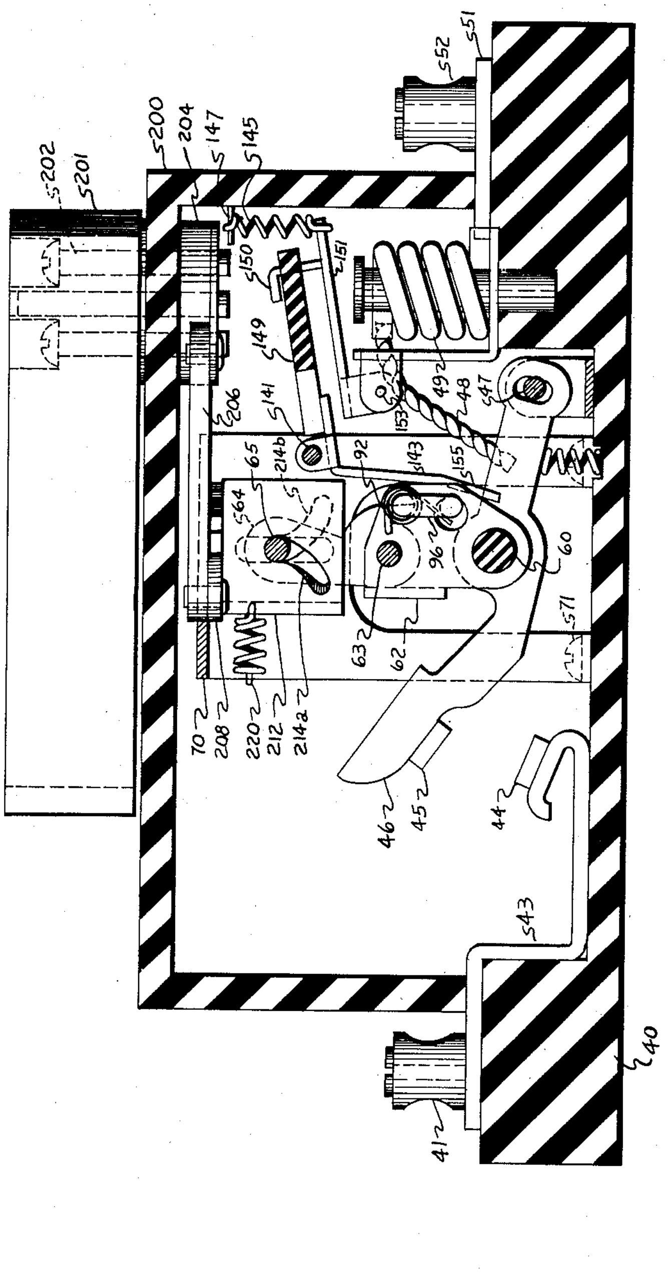
Figure 9:
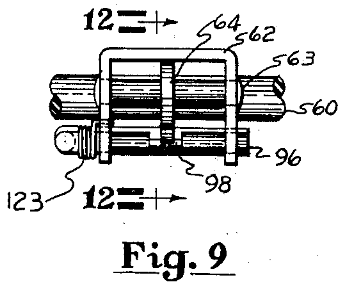
Fig. 9 is a top plan view, showing parts of the control arrangement.
Figure 10:
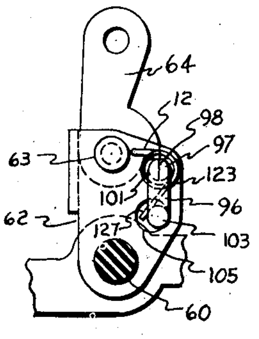
Figs. 10 and 11 are side and end views of the same parts of the control arrangement.
Figure 11:
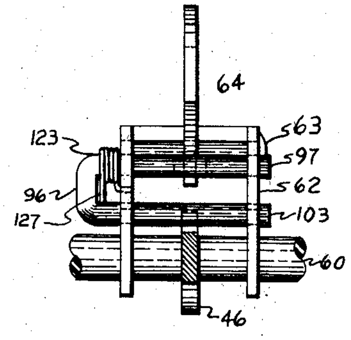
Figure 12:
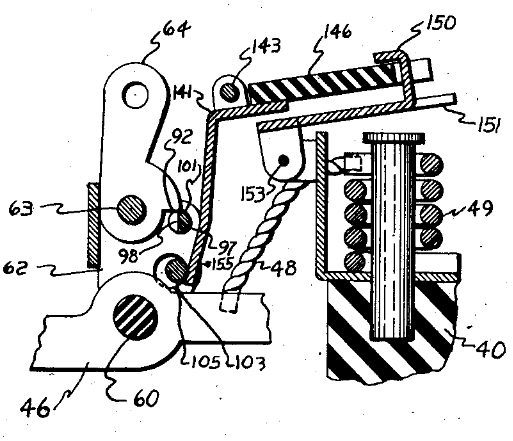
Fig. 12 is a section view as if on line 12—12 of Fig. 9.

In the event sleeve 212 is rotated to the left from the position of Fig. 2 to that of Fig. 4 by "off" movement of handle 201, the slots 214 of sleeve 212 will pull upwardly on pin 65 and on the toggle 64—62, and thus, with the cooperation of springs 121, the contactors 46 will be moved upwardly for circuit opening, Fig. 4.

Reverse rotation of the handle 201 will cause the sleeve 212 to return from the open circuit position of Fig. 4 to the closed circuit position of Fig. 2, slots 214 moving pin 65 and toggle 64—62 downwardly to return contactors 46 to the closed circuit position, and stressing springs 121.

During manual movement, links 62—64 are latched to each other by the latch engagement at 96—98, to move as a unit.

*Trip*

Figure 3:
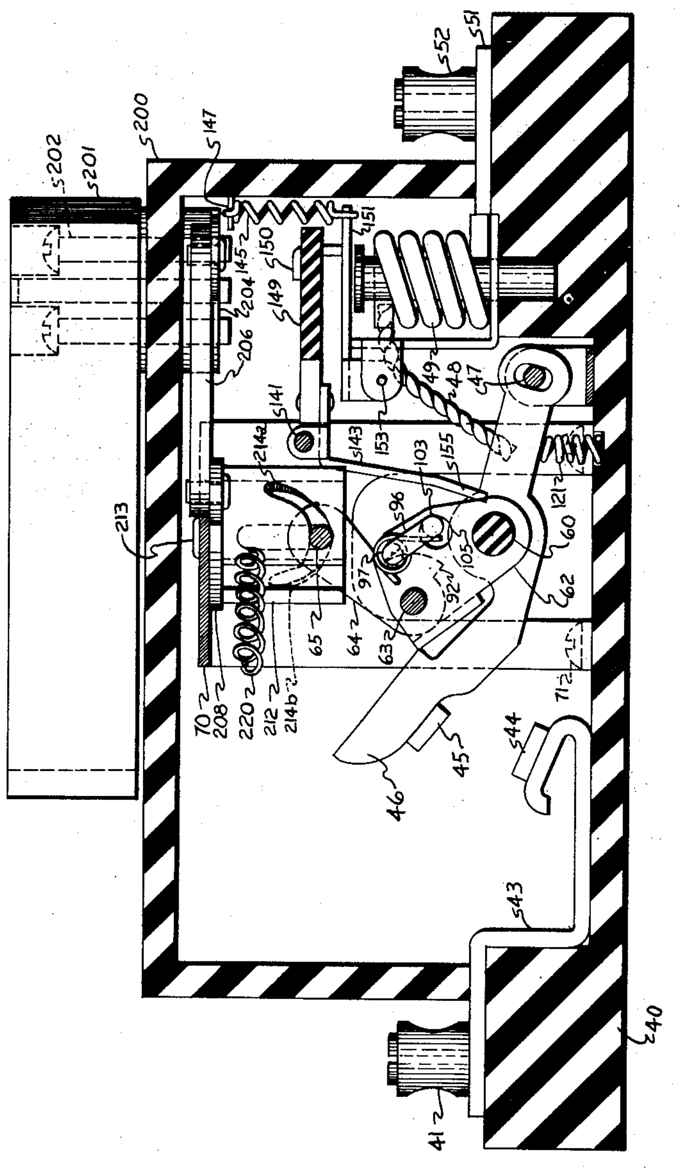
Figs. 3 and 4 are views similar to Fig. 2 but showing the parts in the "tripped" or overload released position and in the "off" or open circuit position, respectively.

In the event of an overload in any pole, a magnet 49 will pull armature 151 downwardly to rock trip lever 143 clockwise on its pivot 141 so that striker 155 will move the lower leg 103 of latch 96 to the left from Fig. 2 and thus rock the upper leg 97 of latch 96 clockwise to present notch 98 to holding extension 92 of holding arm 90 and thus no longer to prevent contactors 46 and link 62 from moving upwardly with respect to link 64, the holding engagement of leg 97 and holding extension 92 having previously been such that extension 92 prevented latch 96 and link 62 from moving upwardly relatively of link 64 under bias of springs 121. With such holding engagement destroyed by tripping movement of latch 96, contactors 46 and link 62 move upwardly with the movement being such that knee or pin 63 connecting links 62 and 64 slides to the left and upwardly around pin 65 as a pivotal axis, toggle 62—64 collapsing as shown in Fig. 3. Pin 65 and sleeve 212 remain stationary during such tripping movement so that tripping movement of the contactors 46 and of the lower link 62 is free of the handle and the sleeve 212.

If, as is ordinarily the case, there is no restraining force on the handle, the thus described tripping movement of the contactors 46 and the links 62—64 to the position of Fig. 3 will be followed without pause by movement of the sleeve 212 and the handle 201, from the "tripped" position of Fig. 3 to the "off" position of Fig. 4 where the movement of the parts terminate. This is a handle return and relatching movement and is caused by the spring 220 which pulls pin 65 and with it the sleeve 212 and the handle 201 from the "tripped" position of Fig. 3 to the "off" position of Fig. 4. In such movement, the toggle 62—64 will become straightened as shown in Fig. 4.

Spring 145 will have meanwhile returned trip lever 141 to its normal position, Figs. 2, 4, in response to termination of the current flow in coil 49 which had momentarily moved the trip lever 141 downwardly for tripping.

The separation of trip lever 143 from latch 96 will permit the relatching or latch biasing spring 123 to move the latch 96 counterclockwise with respect to link 62 so as to reestablish the holding engagement at 92—98.

In this way, tripping under ordinary circumstances due to overload terminates with all parts in the "off" position of Fig. 4 just as if the circuit opening had been in response to manual operation of the handle 201. Even with the handle held and parts 201, 212 and 65 remaining stationary, the circuit will have become opened, by movement of parts 143, 96, 62, 64 and 46. Trip thus can occur free of or without requiring movement of the parts under manual control, namely sleeve 212 or handle 201.

Figure 14:
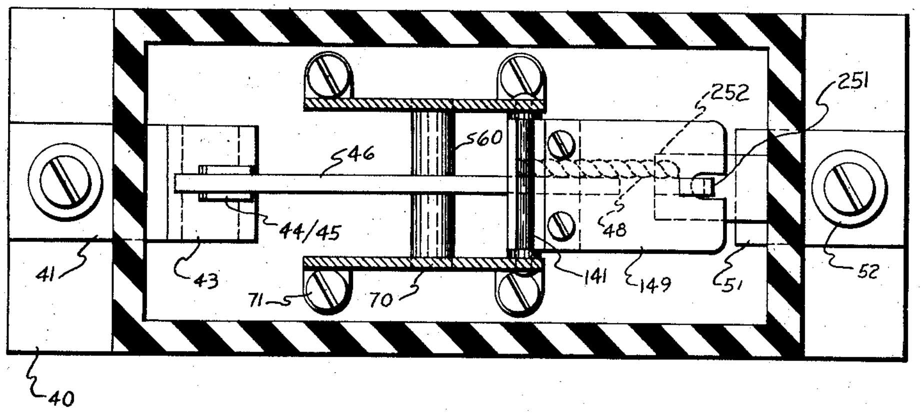
Fig. 14 shows a single pole bimetal latch trip embodiment, in plan view.
Figure 15:
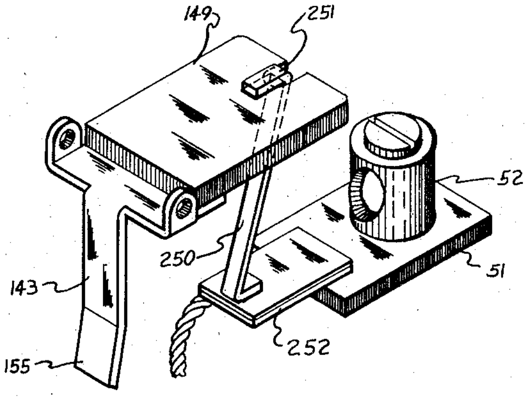
Fig. 15 shows a bimetal latch trip means of the single pole embodiment.

*Figs. 14 and 15*

Unlike the multipolar, magnetic latch trip embodiment of Figs. 1 to 13 where the axle 60 projected well beyond the frame 70 so as to be connected at its ends to two outside contactors 46 and wherein the circuit responsive means for moving the latch trip lever 143 was a plurality of latch trip magnetic coils 49, the embodiment of Figs. 14 to 15 is formed as a single pole embodiment with bimetal latch trip means and this embodiment will now be described.

The axle 60 does not project well beyond the frame 70 but rather terminates substantially at such frame and is connected to a single contactor 46 and to the lower link 62 of toggle 62—64.

For movement of the latch trip lever 143 there is provided a hook 250 hooked at its upper end 251 around the insulating plate 149 and connected at its lower end to a bimetal strip 252 in turn mounted on and connected to the load connector strap 51 and connected by a flexible conductor 48 to the contactor 46.

Now having described the circuit breaker herein disclosed, reference should be had to the claims which follow.

I claim:

1. In a circuit breaker having a toggle linkage comprised of a lower toggle link, and upper toggle link, means connecting said upper and lower toggle links, releasable latch means holding said links in locked position and permitting said linkage to collapse when released, circuit responsive means for automatically releasing said latch means, a contact pivotally connected to said lower link, a manually rotatable actuating means for moving said contact into open circuit position without releasing said latch means, spring means for biasing said contactor to open circuit position upon manual or automatic opening, spring means for simultaneously returning said actuating means to open circuit position upon relatching of said releasable latch, a spirally slotted member having a pin disposed in the slots said pin movably connecting said upper link and said spirally slotted member, the slots of said spirally slotted member having non-curved portions for holding said contactor in an actuated position, guide means disposed adjacent to said spirally slotted member and engaging said pin thereby restricting the motion of said pin to a linear direction; said guide means being in the form of a frame.

2. The structure of claim 1, the frame having cut out portions.

3. The structure of claim 2, the cut out portions being rectangular in shape and disposed vertically so as to restrict the motion of said pin to a linear vertical movement.

ELWOOD T. PLATZ.

REFERENCES CITED

The following references are of record in the file of this patent:

UNITED STATES PATENTS

| Number | Name | Date |
|---|---|---|
| 870,444 | Leonard et al. | Nov. 5, 1907 |
| 893,258 | Mills | July 14, 1908 |
| 926,330 | Hubert | June 29, 1909 |
| 1,815,561 | Getchell | July 21, 1931 |
| 2,203,131 | Coy | June 4, 1940 |
| 2,354,157 | Swingle | July 18, 1944 |
| 2,360,922 | Wilckens | Oct. 24, 1944 |
| 2,469,277 | Schmidt | May 3, 1949 |
| 2,506,505 | Jeffrey | May 2, 1950 |

FOREIGN PATENTS

| Number | Country | Date |
|---|---|---|
| 753,274 | France | Aug. 7, 1933 |